US011102129B2

(12) United States Patent
Burstein et al.

(10) Patent No.: US 11,102,129 B2
(45) Date of Patent: Aug. 24, 2021

(54) ADJUSTING RATE OF OUTGOING DATA REQUESTS FOR AVOIDING INCAST CONGESTION

(71) Applicant: Mellanox Technologies, Ltd., Yokneam (IL)

(72) Inventors: Idan Burstein, Carmiel (IL); Noam Bloch, Bat Shlomo (IL); Roee Moyal, Yokneam Illit (IL); Ariel Shahar, Jerusalem (IL); Yamin Friedman, Nesher (IL); Yuval Shpigelman, Netanya (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 68 days.

(21) Appl. No.: 16/559,640

(22) Filed: Sep. 4, 2019

(65) Prior Publication Data
US 2020/0084150 A1 Mar. 12, 2020

Related U.S. Application Data
(60) Provisional application No. 62/728,802, filed on Sep. 9, 2018.

(51) Int. Cl.
*H04L 12/28* (2006.01)
*H04L 12/801* (2013.01)
(Continued)

(52) U.S. Cl.
CPC .......... *H04L 47/127* (2013.01); *H04L 47/283* (2013.01); *H04L 47/39* (2013.01);
(Continued)

(58) Field of Classification Search
CPC ............ H04L 12/2858; H04L 12/2861; H04L 12/2874; H04L 12/2879; H04L 12/40065;
(Continued)

(56) References Cited

U.S. PATENT DOCUMENTS

| 8,370,496 B1 * | 2/2013 | Marr | H04L 41/145 709/226 |
| 8,873,385 B2 * | 10/2014 | Wu | H04L 69/163 370/230 |

(Continued)

OTHER PUBLICATIONS

InfiniBand Architecture Specification, vol. 1, Release 1.2.1, pp. 1-1727, Nov. 2007.

(Continued)

*Primary Examiner* — Dmitry Levitan
(74) *Attorney, Agent, or Firm* — Kligler & Associates Patent Attorneys Ltd (57) ABSTRACT

A network adapter includes circuitry and one or more ports. The ports connect to a communication network including multiple network elements. The circuitry accesses outbound messages that are pending to be sent over the communication network to multiple remote nodes via the ports. At least some of the outbound messages request the remote nodes to send respective amounts of data back to the network adapter. Based on the amounts of data requested by the outbound messages, the circuitry forecasts a bandwidth of inbound response traffic, which is expected to traverse a selected network element in response to the outbound messages toward the network adapter, determines a schedule for transmitting the outbound messages to the remote nodes so that the forecasted bandwidth meets a bandwidth supported by the selected network element, and transmits the outbound messages to the remote nodes in accordance with the determined schedule.

23 Claims, 3 Drawing Sheets

(51) Int. Cl.
*H04L 12/927* (2013.01)
*H04L 12/863* (2013.01)
*H04L 29/08* (2006.01)
*H04L 12/841* (2013.01)

(52) U.S. Cl.
CPC ........ *H04L 47/6295* (2013.01); *H04L 47/805* (2013.01); *H04L 67/1097* (2013.01)

(58) Field of Classification Search
CPC . H04L 12/40163; H04L 12/587; H04L 47/22; H04L 47/30; H04L 47/722; H04L 47/783
USPC .......................................... 370/412–418, 437
See application file for complete search history.

(56) References Cited

U.S. PATENT DOCUMENTS

| | | | | |
|---|---|---|---|---|
| 9,001,663 | B2* | 4/2015 | Attar | H04L 47/10 370/235.1 |
| 9,210,048 | B1* | 12/2015 | Marr | H04L 41/145 |
| 9,219,689 | B2* | 12/2015 | Crisan | H04L 49/50 |
| 9,276,866 | B2* | 3/2016 | Wu | H04L 47/36 |
| 9,356,878 | B2* | 5/2016 | Hwang | H04L 47/27 |
| 9,544,233 | B2* | 1/2017 | Ansari | H04L 12/18 |
| 10,425,338 | B2* | 9/2019 | Agarwal | H04L 47/12 |
| 2015/0124824 | A1* | 5/2015 | Edsall | H04L 47/32 370/392 |
| 2019/0007317 | A1* | 1/2019 | Cheng | H04L 47/30 |
| 2019/0034464 | A1* | 1/2019 | Nozhchev | G06F 11/30 |
| 2019/0104206 | A1* | 4/2019 | Goel | H04L 45/16 |
| 2019/0104207 | A1* | 4/2019 | Goel | H04L 49/25 |
| 2019/0140962 | A1* | 5/2019 | Thottethodi | G06F 15/17306 |
| 2020/0084150 | A1* | 3/2020 | Burstein | H04L 47/283 |
| 2020/0120036 | A1* | 4/2020 | Zhou | H04L 47/56 |

OTHER PUBLICATIONS

Noormohammadpour et al., "Datacenter Traffic Control: Understanding Techniques and Trade-offs", IEEE Communications Surveys & Tutorials, vol. 20, issue 2, pp. 1492-1525, Dec. 14, 2017.

* cited by examiner

ADJUSTING RATE OF OUTGOING DATA REQUESTS FOR AVOIDING INCAST CONGESTION

CROSS-REFERENCE TO RELATED APPLICATIONS

This application claims the benefit of U.S. Provisional Patent Application 62/728,802, filed Sep. 9, 2018, whose disclosure is incorporated herein by reference.

TECHNICAL FIELD

Embodiments described herein relate generally to data communication, and particularly to methods and systems for avoiding incast congestion by controlling rate of sending data requests to remote nodes.

BACKGROUND

Congestion may occur in a communication network when a buffer in a network element such as a switch or router fills at a higher rate than its emptying rate. A congestion condition may cause severe performance degradation and should be avoided or handled.

Various methods for handling congestion are known in the art. For example, U.S. Patent Application Publication 2019/0140962, describes a receiver-directed congestion control system, which provides receiver-directed apportioning by adding a bandwidth share indicator value to the acknowledgement messages sent by the receiver to the senders. In certain embodiments, bandwidth share indicator value comprises the number of senders seen by the receiver. In other embodiments, the bandwidth share indicator value may comprise a percentage bandwidth share allocated to the sender computer to allow for varying priorities between senders. In the acknowledgement message, each sender may also include the incast degree, which is programmed in the application, to the receiver.

U.S. Pat. No. 9,356,878 describes a method for avoiding a network congestion, including an aggregator and a plurality of workers. The plurality of workers share the same bottleneck link to the aggregator. The method includes counting a number of connections between the aggregator and the worker, and adjusting a window size of each of the workers. The window size is based on the number of connections. The method further includes adding an ACK delay to an ACK, and sending the ACK with the window size to the worker. The ACK delay is based on the window size.

SUMMARY

An embodiment that is described herein provides a network adapter, including circuitry and one or more ports. The one or more ports are configured to connect to a communication network including multiple network elements. The circuitry is configured to access outbound messages that are pending to be sent over the communication network to multiple remote nodes via the one or more ports. At least some of the outbound messages request the remote nodes to send respective amounts of data back to the network adapter. Based on the amounts of data requested by the outbound messages, the circuitry is configured to forecast a bandwidth of inbound response traffic, which is expected to traverse a selected network element in response to the outbound messages toward the network adapter, to determine a schedule for transmitting the outbound messages to the remote nodes so that the forecasted bandwidth meets a bandwidth supported by the selected network element, and to transmit the outbound messages to the remote nodes in accordance with the determined schedule.

In some embodiments, the circuitry is configured to forecast the bandwidth by evaluating a volume of the response traffic that is expected to traverse the selected network element within an imminent time-window and to assign transmission times to the outbound messages so that the forecasted bandwidth meets the bandwidth supported. In other embodiments, the circuitry is configured to assign the transmission times based on measured round-trip times in communicating with the remote nodes. In yet other embodiments, the circuitry is configured to break an outbound message that requests a first amount of data into multiple sub-messages requesting respective second amounts of data smaller than the first amount of data, to forecast the bandwidth based on the second amounts of data, and to determine the schedule for transmitting the multiple sub-messages.

In an embodiment, an outbound message that requests data from a remote node includes a read command that specifies transferring a given amount of data from a source buffer in a memory of the remote node to a destination address in a local memory accessed by the network adapter. In another embodiment, a selected outbound message includes a read command for direct memory access, in accordance with a Remote Direct Memory Access (RDMA) protocol. In yet another embodiment, the outbound messages are queued in one or more queues having multiple respective Quality of Service (QoS) levels, and the circuitry is configured to share available outbound bandwidth among the queues based on the respective QoS levels.

In some embodiments, the network adapter is coupled to the communication network using multiple ports belonging to a Link Aggregation Group (LAG), and the circuitry is configured to forecast bandwidths of portions of the response traffic toward individual ports of the LAG, and to determine the schedule so that the forecasted bandwidths meet bandwidths supported by the individual ports. In other embodiments, the circuitry is configured to transmit an outbound message that requests data from a remote node via a first port, and to receive the requested data from that remote node via a second different port. In yet other embodiments, the circuitry is configured to manage a response credit count that is indicative of available bandwidth for the response traffic, and to determine the schedule for transmitting outbound messages that request data from the remote nodes based at least on the response credit count.

In an embodiment, the circuitry is configured to consume response credits in accordance with amounts of data requested by scheduled outbound messages, to accumulate response credits in accordance with amounts of data received in response to the outbound messages, and to spread the accumulated response credits among multiple queues storing the outbound messages. In another embodiment, the circuitry is configured to determine the schedule by limiting a number of transmitted outbound messages for which data requested from the remote nodes was not yet received, to a predefined number. In yet another embodiment, the circuitry is configured to identify an event of a first QP related to an outbound message whose processing is delayed by the schedule, and is blocking processing of one or more second QPs related to other outbound or inbound messages, the first and second QPs are pending processing in a common Schedule Queue (SQ), and in response to the event, to move the first QP to a different SQ.

In some embodiments, a remote node supports sending requested data at requested time instances, and the circuitry is configured to determine the schedule by sending to the remote node information specifying one or more time instances for sending requested data back in response to the outbound messages.

There is additionally provided, in accordance with an embodiment that is described herein, a method for communication, including, in a network adapter that includes one or more ports for connecting to a communication network including multiple network elements, accessing outbound messages that are pending to be sent over the communication network to multiple remote nodes via the one or more ports. At least some of the outbound messages request the remote nodes to send respective amounts of data back to the network adapter. Based on the amounts of data requested by the outbound messages, a bandwidth of inbound response traffic, which is expected to traverse a selected network element in response to the outbound messages toward the network adapter, is forecasted. A schedule for transmitting the outbound messages to the remote nodes is determined so that the forecasted bandwidth meets a bandwidth supported by the selected network element. The outbound messages are transmitted to the remote nodes in accordance with the determined schedule.

These and other embodiments will be more fully understood from the following detailed description of the embodiments thereof, taken together with the drawings in which:

DETAILED DESCRIPTION OF EMBODIMENTS

Overview

In various computing and other applications, multiple network nodes communicate with one another over a communication network. Applications of this sort comprise, for example, data centers, applications providing cloud services and high-performance computing.

Embodiments that are described herein provide improved systems and methods for avoiding incast congestion in a communication network.

An "incast congestion" is a type of congestion that may occur when many nodes send data over the communication network to, or via, a common destination concurrently. As a result, a buffer at the destination may become congested.

Incast congestion typically degrades the network performance considerably. For example, in a lossless network, incast congestion may cause congestion spread, unfair packet delivery and increased latency. In lossy networks, incast congestion may result in packet retransmission, which degrades throughput and may result in undetermined latencies.

Incast congestion may occur in an edge switch coupled directly to a destination node, e.g., in data centers and in client-server environments operating in a many-to-one configuration. Relevant applications include, for example, compute to disaggregated central storage communication and backend connectivity of storage servers to networked backend storage. Relevant protocols include, for example, the Non-Volatile Memory Express Over Fabric (NVMe-oF) protocol, and the Internet Small Computer System Interface (iSCSI) Extensions for RDMA (iSER) protocol.

In principle, incast congestion may be handled by distributing traffic load over multiple egress ports, e.g., using adaptive routing methods. This approach, however, is typically inapplicable for edge switches.

Alternatively, incast congestion may be addressed using end-to-end congestion control methods, e.g., based on the Explicit Congestion Notification (ECN) scheme. In this approach, the destination node reports congestion back to the source node, which reduces the rate of injecting packets into the network to resolve the congestion. Example end-to-end congestion control schemes include the Data Center TCP (DCTCP) scheme, and the Data Center Quantized Congestion Notification (DCQCN) scheme specified for the RDMA Over Converged Ethernet (RoCEv2) standard. The main disadvantage of end-to-end congestion control schemes is that they react slowly and may fail to resolve an already developing congestion condition.

In yet another approach, a holistic solution is used for preventing incast congestion, e.g., by using a centralized entity in the network that handles traffic flow. For example, a paper entitled "Fastpass: A Centralized "Zero-Queue" Datacenter Network," ACM SIGCOMM Computer Communication, August 2014, describes a centralized arbiter that controls, for each sender, when each packet should be transmitted and what path it should follow. Centralized scheduling aims to prevent congestion by keeping low occupancy of queues in the fabric switches. This approach is typically complex to implement because it requires centralized scheduling of all the communication requests in the network.

In the disclosed embodiments, a network node prevents incast congestion by limiting the rate of requesting data from remote nodes. The embodiments may be implemented by a network adapter such as a Network Interface Controller (NIC) of the network node.

Outbound messages that a network node sends for requesting data from remote nodes are also referred to herein as "data requests." Inbound messages that the remote nodes send back to the requesting node in response to the data requests are also referred to herein as "data response messages" or "response traffic."

In some embodiments, the NIC connects via one or more ports to a communication network comprising multiple network elements. The NIC accesses outbound messages that are pending to be sent over the communication network to multiple remote nodes via the one or more ports. At least some of the outbound messages request the remote nodes to send respective amounts of data back to the NIC. Based on the amounts of data requested by the outbound messages, the NIC forecasts a bandwidth of inbound response traffic, which is expected to traverse a selected network element in response to the outbound messages, toward the NIC. The NIC determines a schedule for transmitting the outbound messages to the remote nodes so that the forecasted bandwidth meets a bandwidth supported by the selected network element. The NIC transmits the outbound messages to the remote nodes in accordance with the determined schedule.

The NIC may forecast the bandwidth, for example, by evaluating a volume of the response traffic that is expected to traverse the selected network element within an imminent time-window. In some embodiments, the NIC determines the schedule by assigning transmission times to the outbound messages so that the forecasted bandwidth meets the bandwidth supported. The NIC may assign the transmission times, for example, based on measured round-trip times in communicating with the remote nodes. In another embodiment, the NIC determines the schedule so that an ingress buffer that will receive at least part of the response traffic, will not become overfilled. This ingress buffer may reside in the NIC or in a network element upstream to the NIC.

In some embodiments, the NIC breaks an outbound message that requests a large amount of data into multiple sub-messages requesting smaller amounts of data. The NIC schedules transmission of the sub-messages and assembles the data sent back by the remote nodes to recover the complete data requested. Requesting smaller amounts of data improves the granularity in scheduling the data requests for avoiding incast congestion.

In some embodiments, an outbound message that requests data from a remote node comprises a read command such as a Remote Direct Memory Access (RDMA) READ command when using an RDMA-based protocol, or a Ready to Transfer (R2T) command when using TCP. For example, in a client-server communication mode, a server node comprising the NIC may send the read command to a client node, in response to a WRITE command received from by the server node from the client node.

In some embodiments, the NIC is coupled to the communication network in a Link Aggregation Group (LAG) configuration. In such embodiments, the NIC may prevent incast congestion in individual links of the LAG. To this end, the NIC holds a mapping between pairs of output ports and input ports serving respectively for sending data requests and receiving the data response messages.

In some embodiments, the outbound messages are queued in one or more queues having multiple respective Quality of Service (QoS) levels. The NIC shares the available outbound bandwidth by arbitrating among the queues based on the respective QoS levels, and schedules transmission of the outbound messages that request data from the remote nodes based at least on a response credit count that is indicative of the available bandwidth for the response traffic.

In the disclosed techniques, a server node schedules data requests to multiple remote nodes so as to prevent incast congestion that may result by the data sent by the remote nodes back to the requesting server node. The server node controls the transmission rate of the data requests by forecasting the bandwidth of the data that will be sent back in response to the data requests. Scheduling the data requests is carried out at the server side, without involving the remote nodes or any centralized entity in the network.

System Description

Figure 1:
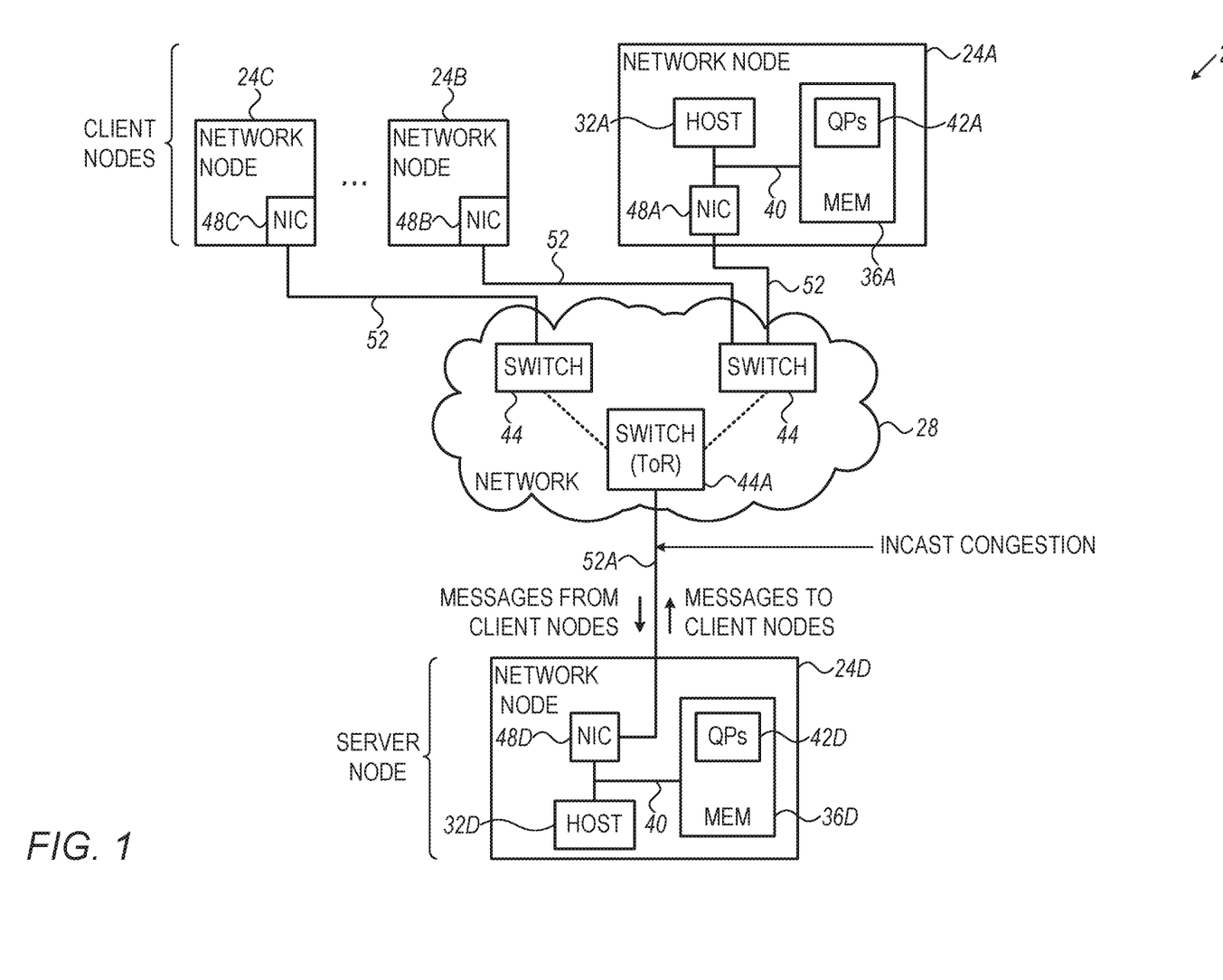
FIG. 1 is a block diagram that schematically illustrates a computing system, in accordance with an embodiment that is described herein.

FIG. 1 is a block diagram that schematically illustrates a computing system 20, in accordance with an embodiment that is described herein.

Computing system 20 comprises multiple network nodes 24 that communicate with one another over a communication network 28. Computing system 20 may be used in various applications, such as, for example, data centers, systems providing cloud services, high-performance computing and distributed computing.

Network node 24 comprises a host processor 32 coupled to a memory 36 using a link or bus 40. Host processor 32 may comprise any suitable type of processor or a Central Processing Unit (CPU). Memory 36 may reside within or externally to network node 24 and may comprise any suitable type of memory implemented using any suitable storage technology. For example, in some embodiments, memory 36 may comprise a Random Access Memory (RAM), a Nonvolatile Memory (NVM) or a combination of a RAM and a NVM. Bus 40 may comprise any suitable type of bus or link, such as, for example, a Peripheral Component Interconnect-Express (PCIe) bus.

In the present example, communication network 28 comprises a fabric of network elements 44, such as, for example switches, routers or any other suitable type of a network element. The communication network may comprise any suitable type of a communication network, such as, for example, an Ethernet network, an Internet Protocol (IP) network or an InfiniBand™ (IB) network. Communication network 28 may operate at any suitable rate, using any suitable communication protocols such as the Transmission Control Protocol (TCP) or the Remote Direct Memory Access (RDMA) protocol.

Communication network 28 may operate in a lossy or lossless mode. In a lossy network packets may be dropped and retransmission, e.g. in case of congestion. In a lossless network packets are not dropped, and an overfilled buffer may cause congestion spread to network elements upstream.

Network node 24 comprises a Network Interface Controller (NIC) 48 coupled to host processor 32 and to memory 36 using bus 40. The NIC connects between the network node and a network element 44 in communication network 28 using a suitable link 52, e.g., a coaxial or fiber link. Alternatively, in connecting to an InfiniBand network, the network interface (48) may comprise a host channel adapter (HCA).

In some embodiments, 52A comprises a Link Aggregation Group (LAG) that combines multiple ports to create a single high-bandwidth data path. Using a LAG configuration may provide bandwidth sharing and load balancing among the multiple ports of the LAG, and may improve connection reliability by specifying redundant ports.

In some embodiments, network node 24D functions as a server node serving multiple client nodes such as network nodes 24A, 24B and 24C. In an embodiment, the client nodes communicate with the server node using a request-response protocol, as will be described below.

In some embodiments, network nodes 24 support communication protocols that enable direct data transfer between network nodes without involving the host processors, such as the Remote Direct Memory Access (RDMA) protocol or other protocols that are based on the RDMA protocol.

Using RDMA protocols, NIC 48 carries out direct memory access operations over communication network 28 from the memory of one host to another without directly involving the host operating systems. For example, NIC 48D of server node 24D may execute a RDMA WRITE command that specifies a source buffer in the local host memory 36D and instructs the NIC to transfer the data in the buffer, via one or more packets sent over communication network 28, to a target address in the host memory of a (remote) target node, e.g., memory 36A of network node 24A. The NIC at the target node receives the packets and writes the data to the target address. In similar fashion, NIC 48D may execute a RDMA READ command that specifies a source buffer in a remote node (e.g., in memory 36A of network node 24A) and causes the NIC (48D) to request the data in the source buffer and then, upon receiving the data from the remote node, to write the data to a target address in the local host memory 36D.

In embodiments that use an RDMA protocol, a software application running on host processor 32 communicates with the transport layer of communication network 28 (e.g., IB network) by manipulating a transport service instance, known as a Queue Pair (QP) 42. Each QP is made up of a send work queue and a receive work queue. To send and receive messages over the network using a NIC (or HCA in IB networks), the software application submits work items, called Work Queue Elements (WQEs), for execution by the NIC. (More precisely, the software application initiates Work Requests (WRs), which cause WQEs to be placed in the appropriate work queues.) After it has finished servicing a WQE, the NIC typically writes a completion report, in the form of a Completion Queue Element (CQE), to a completion queue (not shown), to be read by the software application as an indication that the work request has been executed.

The RDMA READ and RDMA WRITE operations are an integral part of the transport-layer protocol. These operations provide high-throughput, low-latency data transfers, which are carried out by the NIC under application-level control. RDMA over Converged Ethernet (RoCE) and the Internet Wide Area RDMA Protocol (iWARP) offer similar capabilities over an Ethernet network.

In some embodiments, server node 24D sends outbound messages to multiple client nodes, over communication network 28, wherein at least some of these outbound messages comprise data requests that request the client nodes to send data back to the server node. When multiple client nodes send the data back concurrently, or overlapping in time, an incast congestion may occur in a switch 44 along a path from the client nodes to the server node. For example, incast congestion may occur in a switch 44 that aggregates a large portion of the response traffic sent back to the server node, such as edge switch 44A that connects directly to server node 24D via link 52A. Such an edge switch is sometimes referred to as a Top of Rack (ToR) switch.

In some embodiments, NIC 48D prevents an incast congestion condition, by controlling the rate of sending data requests to remote nodes. Methods for prevent incast congestion will be described in detail below.

Figure 2:
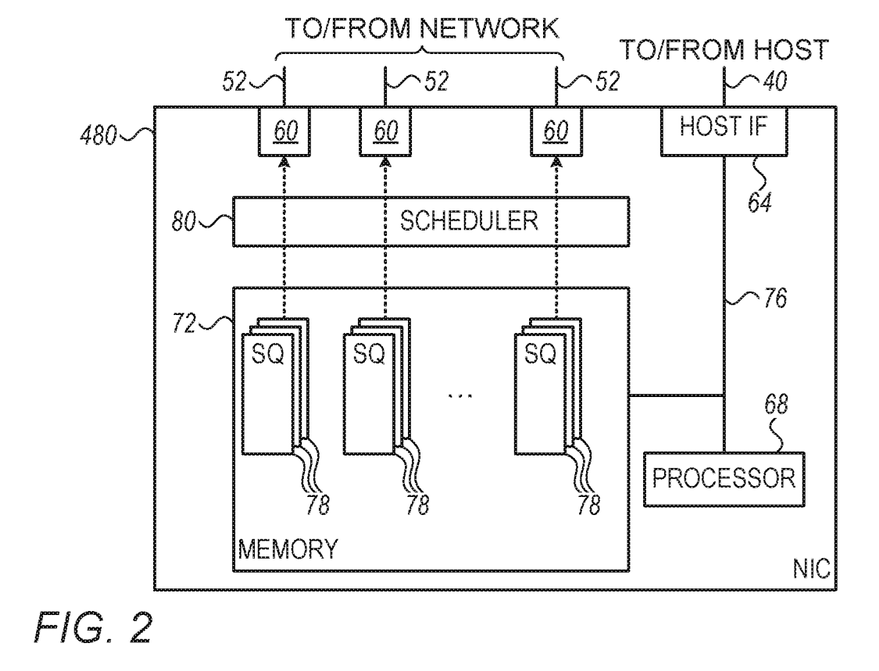
FIG. 2 is a block diagram that schematically illustrates a Network Interface Controller (NIC) scheduling transmission of outbound messages for preventing incast congestion, in accordance with an embodiment that is descried herein.

FIG. 2 is a block diagram that schematically illustrates a Network Interface Controller (NIC) scheduling transmission of outbound messages for preventing incast congestion, in accordance with an embodiment that is descried herein. The description of NIC in FIG. 2 refers to NICs such as 48A . . . 48D in FIG. 1, with emphasis on NIC 48D that implements incast congestion avoidance.

NIC 48D comprises multiple ports 60 for connecting to communication network 28 using links 52, and a host interface 64 for connecting to host processor 32D via bus 40. In some embodiments, each port 60 functions both as an input port for receiving packets from communication network 28 and as an output port for transmitting packets to communication network 28. Alternatively, a given port 60 may function either as an input port or as an output port.

NIC 48D further comprises a processor 68 and a memory 72. Processor 68 is coupled to host interface 64 and to memory 72 using any suitable bus 76, e.g., a PCIe bus. Processor 68 performs various tasks for the NIC such as packet processing and handling communication protocols. Packet processing tasks may include, for example, packet validation queueing and routing.

In some embodiments, each port 60 is associated with one or more Schedule Queues (SQs) 78, which are typically implemented in memory 72. Alternatively, SQs 78 may be implemented in memory 36D of the serve node (not shown) and accessed by NIC 48D. Each SQ 78 queues outbound messages to be transmitted to the client nodes over communication network 28 via a respective port. In an embodiment, the outbound messages are queued in the SQ in the form of pointers to QPs 42D that store WQEs specifying the outbound messages. In the present context the term "a message queued in a SQ" may refer to an element in SQ comprising one of: (i) the message itself, (ii) a pointer to the message stored in some memory, (iii) a pointer to another queue that stores the message (iv), a pointer to a QP that stores a WQE specifying the message.

NIC 48D comprises a scheduler 80 that manages the transmission of outbound messages queued in SQs 78 via ports 60. The functionality of scheduler 80 may be implemented in hardware and/or by processor 68. In some embodiments, SQs 78 are assigned respective Quality of Service (QoS) levels. In such embodiments, the scheduler arbitrates among the SQs of a common port, for sharing the outbound bandwidth available via the port among the SQs, based on their QoS levels. Moreover, as will be described in detail below, scheduler 80 controls the rate of transmitting queued outbound messages to remote nodes, for avoiding incast congestion.

As a general remark, note that packets comprising inbound messages of the response messages may be assigned by the remote nodes QoS levels independently of the QoS levels assigned to packets comprising the outbound messages.

The configuration of computing system 20 in FIG. 1, and the configurations of network node 24D in FIG. 1 and of NIC 48D in FIG. 2, are example configurations, which are chosen purely for the sake of conceptual clarity. In alternative embodiments, any other suitable configurations of a computing system, network node and/or NIC can also be used.

The different elements of network node 24D and of NIC 48D may be implemented using any suitable hardware, such as in an Application-Specific Integrated Circuit (ASIC) or Field-Programmable Gate Array (FPGA). In some embodiments, some elements of network node 24D and of NIC 48D can be implemented using software, or using a combination of hardware and software elements.

Elements that are not necessary for understanding the principles of the present application, such as various interfaces, addressing circuits, timing and sequencing circuits and debugging circuits, have been omitted from FIGS. 1 and 2 for clarity.

In some embodiments, host processor 32D and/or processor 68 may comprise general-purpose processors, which are programmed in software to carry out the network manager and/or switch functions described herein. The software may be downloaded to the computer in electronic form, over a network, for example, or it may, alternatively or additionally, be provided and/or stored on non-transitory tangible media, such as magnetic, optical, or electronic memory.

Memory 36D of network node 24D and/or memory 72 of NIC 48D may comprise any suitable type of storage device such as, for example, a RAM, NVM or a combination of RAM and NVM.

In the description that follows, and in the claims, the term "circuitry" refers to all the elements of NIC 48D excluding ports 60. In the example of FIG. 2, the circuitry comprises processor 68, scheduler 80 and memory 72 of NIC 48D.

Incast Congestion in Client-Server Communication

As noted above, incast congestion may occur when multiple network nodes concurrently send data to a common target network node. Such a scenario applies, for example, in a client-server environment, when a server node requests multiple client nodes to send data back to the server node over the communication network.

Assume, for example, that server node 24D in FIG. 1 serves multiple client nodes 24, including client node 24A. In a client-server environment, the client nodes may communicate with the server node using a request-response protocol such as the Remote Procedure Call (PRC) protocol. The PRC protocol is specified, for example, in a Request for Comments (RFC) 5531, entitled "RPC: Remote Procedure Call Protocol Specification Version 2," May 2009.

In some embodiments, a client node (e.g., 24A) requests a service from server node 24D by sending to the server node a suitable command. The client node may send to the server node commands of various types such as: (i) a WRITE command for transferring data from the client node to the server node, (ii) a READ command for transferring data from the server node to the client node, and (iii) a No Data command that does not involve transferring data between the client node and the server node. A command of this sort may, for example, serve an administration task, e.g., a task for cyclically sending keep-alive messages for verifying that a connection remains intact.

A WRITE command may specify a source buffer in memory 36A of the client node, a target address in memory 36D of the server node and an amount of data (e.g., in Bytes) to be written. A READ command may specify a source buffer in memory 36D of the server node, a target address in memory 36A of the client node, and an amount of data to be read.

In some embodiments, NIC 48A of the client node encapsulates the command, e.g., in an RDMA SEND message, and transmits the encapsulated command to NIC 48D of server node 24D over the communication network. The size of the command is typically on the order of several Kbytes.

Upon receiving the encapsulated command, NIC 48D retrieves the command, and delivers the retrieved command to server node 24D. The server node queues the command (or a work request corresponding to the command) for later execution. When scheduled, the server node executes the command, and when done, the server node sends to the requesting client node a suitable response message.

Server node 24D typically queues commands (or work requests) for serving multiple client nodes. Since the commands have small sizes, the server node may queue a large number of commands for serving many client nodes concurrently.

When a WRITE command is scheduled for processing, the server node sends to the relevant client node a message that requests the client node to send the data to be written back to the server node. For example, the outbound message comprises a RDMA READ message, which is typically transmitted to the NIC of the client node using an RDMA SEND message. In response to the RDMA READ message, the NIC of the client node transfers the requested data directly from the source buffer in the memory of the client node to the target address in the memory of the server node. Alternatively, when using TCP and a protocol such as the Internet Small Computer System Interface (iSCSI) protocol, the outbound message may comprise a "Ready to Transfer" (R2T) message requesting the client node to send the data back to the server node.

When a READ command is scheduled for processing, the server node sends the requested data back to the client node, followed by a response message. In RDMA, the NIC of the server node transmits the data from the source buffer in the server node to the target address in the client node using an RDMA WRITE command. Alternatively, the server node sends to the client node a suitable RDMA SEND command that triggers the client to perform a RDMA READ at the client node side.

As will be described below, the server may control the transmission of commands to the client nodes for controlling problematic traffic patterns, such as those causing incast congestion.

The sizes of the outbound messages requesting data from client nodes (e.g., RDMA READ messages) are between 64 and 128 Bytes (depending on various factors such as the version of the underlying IP protocol, an encapsulation method used and the like). The size of the requested data is typically much larger, e.g., up to 2 GBytes. Note that the amount of data corresponding to N RDMA READ messages is about 2e9/64 or 32 million times smaller than the amount of data in the N 2 GBytes of the data response messages. This means that a relatively small number of data requests sent to client nodes within a short period of time may be sufficient to cause in incast congestion.

Methods for Preventing Incast Congestion

Figure 3:
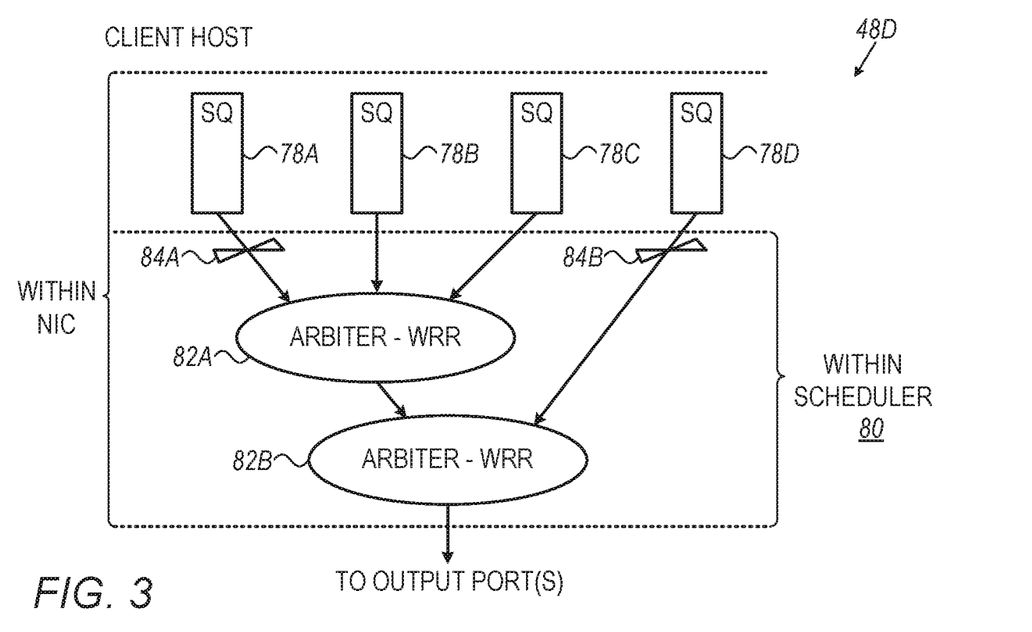
FIG. 3 is a diagram that schematically illustrates a scheduling scheme for preventing incast congestion, in accordance with an embodiment that is described herein.

FIG. 3 is a diagram that schematically illustrates a scheduling scheme for preventing incast congestion, in accordance with an embodiment that is described herein.

FIG. 3 depicts multiple SQs 78 that queue outbound messages to be transmitted to multiple remote network nodes. In the present example, the outbound messages are pending transmission by NIC 48D of server node 24D to client nodes, e.g., 24A, 24B and 24C, over communication network 28. Each SQ 78 may be assigned to one or more entities running on server node 24D, wherein such an entity may comprise, for example, a Virtual Machine (VM), a container, or a group of one or more connections representing an application program or a process.

At least some the outbound messages queued in SQs 78 comprises data requests, requesting the target client nodes to send certain respective amounts of data back to the server node. In some embodiments, scheduler 80 schedules the transmission of outbound messages from the SQs to the remote nodes so that the forecasted amount of the data that will be sent back by the client nodes in response to the outbound messages will not cause incast congestion in edge switch 44A or in another selected switch in communication network 28.

In some embodiments, each SQ 78 is assigned a respective QoS level, and scheduler 80 arbitrates among the SQs for sharing the available bandwidth for outbound transmission in accordance with the respective QoS levels. In the example of FIG. 3, scheduler 80 applies a hierarchical arbitration scheme comprising Weighted Round-Robin (WRR) arbiters 82A and 82B. Arbiter 82A arbitrates among a group of SQs 78A . . . 78C, whereas arbiter 82B arbitrates between SQ 78D and the outcome of arbiter 82A. In alternative embodiments, other suitable arbitration schemes can also be used.

Arbiters 82A and 82B may share the available bandwidth among the SQs in various ways. In some embodiments, the WRR arbiter scans the SQs cyclically in some order and transmits a queued message from a visited SQ in one or more packets. In some embodiments, the WRR arbiter visits each SQ once in a service round and transmits from a visited SQ a number of packets that depends on the QoS level of that SQ. In other embodiments, the WRR arbiter visits each SQ multiple times in a service round, depending on their QoS levels, and transmits from a visited SQ a single packet.

In some embodiments, scheduler 80 controls the transmission rate via port 60 using a pacer 84. In the example of FIG. 3, scheduler 80 applies pacers 84A and 84B to control the transmission rates from respective SQs 78A and a 78D via a port 60 associated with these SQs.

Pacers 84 may control the transmission rate via port 60 using any suitable pacing method. For example, pacer 84 may be modeled as a bucket that accumulates credits at a predefined rate. When a packet to be transmitted from a SQ meets the accumulated credit, the scheduler transmits the packet and consumes an amount of credits corresponding to the size of that packet.

In some embodiments scheduler 80 controls (e.g., using pacers 84) the transmission rate via port 60 so that (i) the outbound traffic does not exceed the outbound bandwidth available toward the communication network, and (ii) the response traffic expected to be sent back by the client nodes, causes no incast congestion in edge switch 44A or in another selected switch. In some embodiments, the scheduler forecasts the volume of the response traffic within some imminent time-window, and schedules transmission of the data requests such that the volume of the response traffic within the time-window meets the available inbound bandwidth.

In some embodiments, NIC 48D monitors commands exchanged by the sever node and the client nodes, and identifies exchanged commands that request data transfer from the client nodes to the server node. Based on the amounts of data requested by the identified commands, NIC 48D controls the transmission rate of data requests from to client nodes, as described above. This approach is applicable also to TCP protocols. For example, the NIC identifies iSCSI R2T requests exchanged by the server node and the client nodes, and controls the transmission rate of the R2T requests to the client nodes to avoid incast congestion.

In some embodiments, in addition to controlling transmission of outbound messages for preventing incast congestion, the NIC may also control the rate of pushing data toward the client nodes. For example, in some embodiments, the server node or its NIC receives from a client node an upper layer message, e.g., a read request in accordance with the NVMe-oF protocol, and schedules transmission of RDMA WRITE messages corresponding to that read request, toward the client node, e.g., based on credits available for outbound transmissions.

In some embodiments, the scheduler handles separate credit counts for outbound traffic and for forecasted response traffic. In the present context, the term "response traffic" refers to data traffic arriving in the switch in response to the outbound messages that request data from the remote nodes. The scheduler accumulates outbound credits at a predefined rate and controls the transmission rate of outbound messages based on the accumulated outbound credits. Moreover, for preventing incast congestion, the scheduler controls the transmission of outbound messages that request data from the client nodes, based on the accumulated response credit count. The scheduler accumulates response credits over time and/or in response to receiving requested data and consumes response credits for outgoing packets or messages that request data from the client nodes. In some embodiments, the scheduler accumulates response credits in response to a timeout event sent in accordance with round-trip time measurements. The timeout event may indicate that the requested data was not received.

In some embodiments, scheduler 80 periodically spreads outbound credits among the SQs for sharing the outbound bandwidth among the SQs. For example, in spreading the outbound credits, each SQ gets an amount of the outbound credits relative to its QoS level. In some embodiments, a similar spreading scheme applies to the response credits. Alternatively, response credits may be returned to the general pool of response credits, and the scheduler spreads response credits from the pool among the SQs, e.g., based on the QoS hierarchy.

To meet the outbound bandwidth available for transmission via a port 60, the scheduler may spread the outbound credits over a long time period, so that on average the SQs (or corresponding applications) get their relative share of the bandwidth in accordance with the QoS levels. On the other hand, data requests contribute little to the outbound traffic but may create bandwidth amplification of ×1000 times or more in the inbound direction. In an embodiment, in order to prevent incast congestion, the scheduler accurately divides and spreads response credits among the SQs over short time periods. In one embodiment, dedicated hardware may scan the SQs and accumulate response credits for the SQs according to a pre-configured re-filling pace defined by the NIC firmware. In an example embodiment, assuming a known line bandwidth, the NIC may restore (e.g., accumulate) response credits at a selected rate such that over a given time period the NIC will not request amounts of data that may exceed the line capability. The NIC may assign response credits that were accumulated over time to the SQs based on the configured QoS levels.

In some embodiments, NIC 48D breaks messages from the application layer into multiple smaller messages or packets, which enables flexibility and fairness in performing arbitration and pacing for outgoing traffic. In some embodiments, to improve granularity in scheduling data requests, the NIC breaks outbound messages that request large amounts of data, into multiple sub-messages that each requests a smaller amount of data compared to the original message. To this end, the NIC identifies outbound messages requesting data from remote nodes, e.g., RDMA READ, NVMe-oF READ or iSCSI READ commands, and breaks such outbound messages into multiple sub-messages. The NIC schedules transmission of the sub-messages by forecasting the bandwidth of the response traffic based on the amounts of data requested in the sub-messages, and assembles the data sent in response to the sub-messages to recover the complete data requested. By breaking up messages requesting large amounts of data to sub-messages requesting smaller amounts of data, the granularity in using response credits per packet improves, which allows finer control in scheduling transmission of outbound message by the NIC.

The NIC may break a single outbound message, e.g., a READ command, into multiple READ commands that each requests a relatively small amount of data to be sent back, so that the amount of data requested by one or more of the multiple READ commands fits within some burst size. The NIC accumulates the data sent back in response to the smaller READ commands, to recover the complete data requested, and then notifies the server node that the original READ command has completed.

In some embodiments, the NIC modifies the burst size dynamically, e.g., based on factors that depend on the behavior of the remote nodes. Such factors comprise, for example, the round-trip time in communicating with that remote node, a limitation imposed on the transmission rate by a client node and the like. Alternatively or additionally, the NIC modifies the burst size based on the inbound rate available in the server node. For example, when inbound traffic load is low (or high) the NIC may use a large (or small) burst size.

Controlling the burst size allows fine grained control as explained herein. Since a small-sized packet may request a wide range of data sizes from remote nodes, waiting for sufficient amount of response credits for sending a full request may take a long time or cause too much incoming data within a time frame. Breaking a large data request into multiple smaller data requests allows better scheduling of incoming data.

In some embodiments, for outbound messages that do not request data from remote nodes, the scheduler determines respective transmission times and starts transmitting each outbound message at its scheduled time. In scheduling outbound messages that request data from the remote nodes, the NIC takes into consideration uncertainties in the times of receiving the response data at the NIC. Such uncertainties may result, for example, due to varying traffic loads and unknown delays caused by the remote nodes. In some embodiments, the scheduler measures a round-trip time, e.g., per each remote node or a round-trip time averaged over multiple SQs, for accurately evaluating the amount of data that is expected to be sent back in the response traffic within an imminent time-window. The round-trip time is indicative of the time elapsing between sending an outbound message and receiving the data requested by that outbound message. Therefore, measured round-trip times may be used by the scheduler, in an embodiment, for determining transmissions times of the outbound messages. Accurate schedule may be achieved using the round-trip time measurements, for example, in networks in which the round-trip times have approximately fixed values.

In some embodiments, measured round-trip times may be used for deciding how many response credits to allocate for incoming data. Note that there is typically some uncertainty in the response times, and therefore requesting data for full wire speed may result in bursts of incoming data overwhelming the receiver (e.g., server). In some embodiments, this may be resolved by requesting less data that the wire speed. In some embodiments, the measured round-trip times provide an estimation of the expected burstiness in the incoming data, which burstiness serves for tuning the accumulation rate of response credits.

In some embodiments, the remote nodes support sending the requested data at known times, e.g., at requested time instances. In such embodiments, the NIC may send to the remote nodes information specifying one or more time instances (e.g., timestamps) for transmitting the requested data, wherein the NIC determines the timestamps so as to avoid incast congestion.

Scheduling the outbound messages to prevent incast congestion requires accurate forecasting of the bandwidth of the response traffic, which is not always supported. In some embodiments, to ensure preventing incast congestion, the scheduler limits the number of remote nodes from which the scheduler requests data concurrently. This limits the maximal bandwidth of the response traffic that may cause incast congestion. The maximal number of concurrent remote nodes from which the scheduler requests data may correspond, for example, to a group of connections (in a selected SQ), or to the entire NIC (or SQs).

In an embodiment, the NIC schedules transmission of the outbound messages so as to limit the number of outstanding data requests, e.g., transmitted data requests for which the requested data was not yet received, below a predefined number. The NIC updates the actual number of concurrent outstanding data requests, upon successful reception of the requested data or in response to an indication that the requested data was not received successfully.

In some embodiments, the scheduler determines transmission times for the data requests so that the forecasted bandwidth meets the bandwidth supported. In an embodiment, the scheduler determines the transmission times based on measured round-trip times in communicating with the remote nodes. Measuring the round-trip times may be carried out by the NIC, by the server comprising the NIC or by both the NIC and server. Alternatively or additionally, the scheduler may determine the schedule so that an ingress buffer receiving at least part of the response traffic will not become overfilled. Such an ingress buffer may reside, for example, in the NIC of the server node or in a switch 44 upstream to the NIC, e.g., edge switch 44A. This scheme may apply to a group of connections associated with selected SQ, or to the entire NIC (or SQs).

The scheduler scheme that attempts to prevent incast congestion in ingress buffers of edge switch 44A enables overprovisioning of the bandwidth (e.g., above the wire speed) of the ingress port in NIC 48D, while preventing incast congestion in one or more switches upstream to the edge switch. In using this scheme, the mapping between connections and SQs should typically be coordinated with a mapping of a multipath method employed, e.g., the Equal-Cost Multi-Path (ECMP) mapping of the communication network. ECMP is a multipath technique for selecting a path among multiple paths for traffic to traverse. In order to control the amount of traffic traversing some part of the network, scheduling the outbound messages may require knowledge of which remote nodes will be sending through that part of the network, and this information may be coordinated with the ECMP mapping.

In some embodiments, NIC 48D communicates over link 52A in a LAG configuration comprising multiple LAG links coupled to multiple respective ports 60. Traffic distribution among the LAG link is not always well balanced, e.g., when many flows are delivered via one of the LAG links. In some embodiments, the NIC prevents incast congestion for the individual LAG links or ports. The NIC may hold a mapping between output ports of the LAG that transmit data requests and respective ports of the LAG that receive data response messages. The mapping should be synchronized with the ECMP mapping of the network. Alternatively, assuming traffic pattern that is balanced among the LAG links, the NIC may forecast the bandwidth of the response traffic jointly over the individual ports.

Note that in some embodiments, the NIC may transmit outbound messages that request data from one or more remote nodes via a first port (functioning as an output port), and receive the response traffic from these remote nodes via a second different port (serving as an input port). Moreover, the QoS of inbound packets may be assigned independently from the QoS level assigned to outbound packets. The first and second ports in this case are not necessarily belonging to a LAG.

In an embodiment, the NIC forecasts bandwidths of portions of the response traffic toward individual ports of the LAG, and schedules transmission of the outbound messages so that the forecasted bandwidths meet bandwidths supported by the individual ports.

Assuming that the requested data arrive closely to the expected time instances, the NIC may request as much data as supported by the line rate, under the assumption that possible small delays in receiving the requested data can be handled by the network.

In some embodiments, when a SQ has no credits for performing a communication operation, the SQ stops processing its queued QPs until accumulating a sufficiently large number of credits. Such a scheme may result in a head of line blocking condition between QPs of the SQ used for transmitting data and QPs of the same SQ that are used for receiving data. For example, the processing of a QP related to an outbound message may be delayed for preventing incast congestion, and therefore may block the processing of other QPs (related to other outbound or inbound messages) in the same SQ. In some embodiments, the NIC supports re-queueing by transferring a QP from one SQ to another SQ, e.g., in accordance with the WQE operation code and/or the size of the data being requested. In an embodiment, the NIC may move the first QP to a different SQ to release the blocking. In an example embodiment, the NIC allocates a SQ for egress workloads and a separate SQ for ingress workloads, and may move one or more QPs between these SQs for preventing head of line blocking as described above. This method may be applied in any suitable way of queueing outbound messages in SQs, such as the direct or indirect queuing via pointers, noted above.

In some embodiments, in scheduling the outbound messages, the NIC takes into consideration scheduling priorities in accordance with some criteria. For example, the NIC may schedule data requests to one remote node with higher priority compared to another remote node, based on a predefined policy (e.g., a bandwidth allocation policy) that may assign different priorities to different remote nodes. As another example, the NIC may schedule data requests to different remote nodes with different priorities based on the underlying transport layer protocols used by the respective remote nodes.

Figure 4:
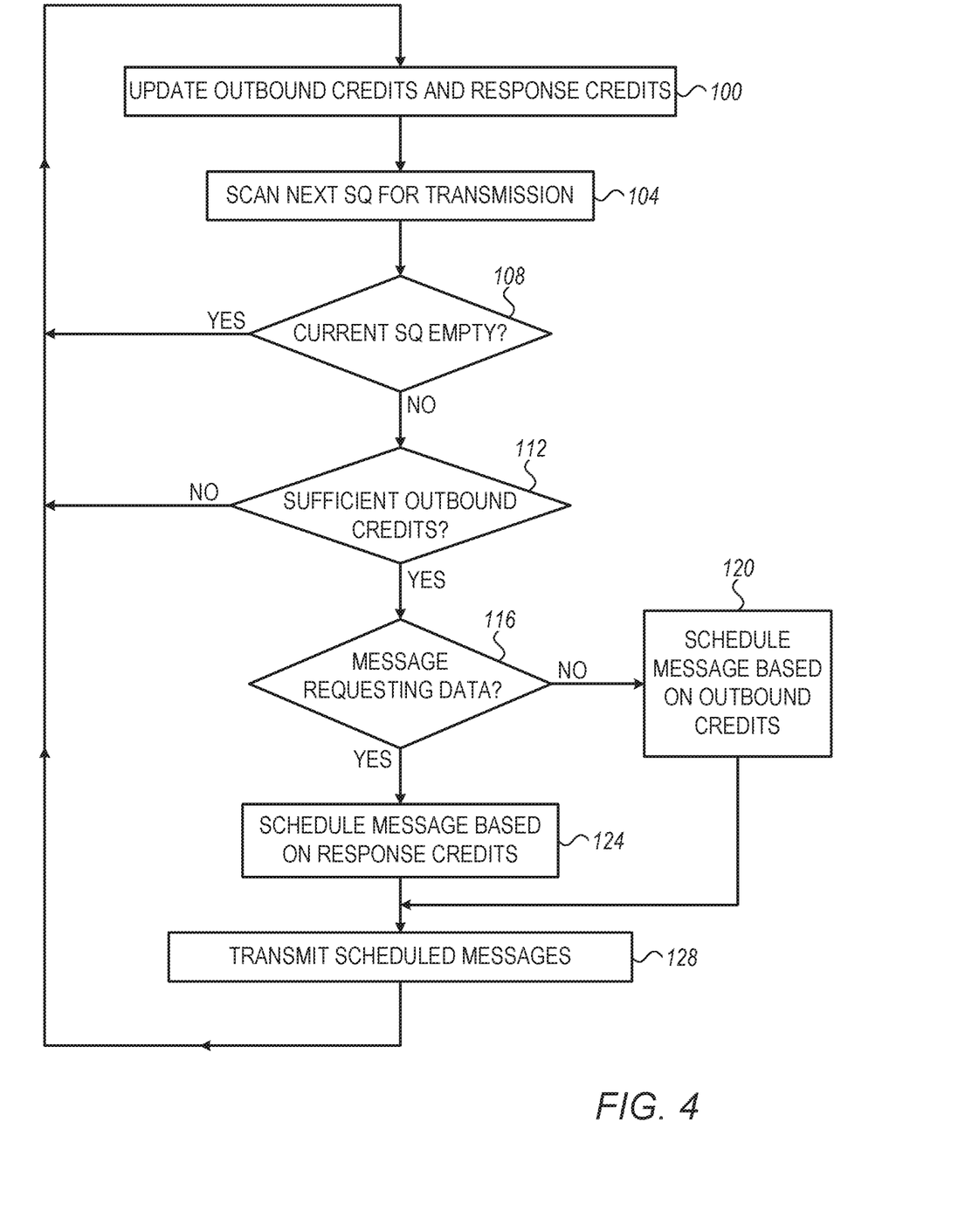
FIG. 4 is a flow chart that schematically illustrates a method for preventing incast congestion, in accordance with an embodiment that is described herein.

FIG. 4 is a flow chart that schematically illustrates a method for preventing incast congestion, in accordance with an embodiment that is described herein.

The method will be described as executed by NIC 48D of server node 24D. In describing the method, the NIC is assumed to hold two types of credits denoted outbound credits and response credits. The outbound credits are used for managing transmission of outbound messages via an output port at the wire speed, or less. The response credits are used for pacing the transmission of outbound messages that request data from remote network nodes, for preventing incast congestion. The response credit count is indicative of the available bandwidth for the response traffic.

The method begins with the NIC updating the outbound credit count and the response credit count, at a credit updating step 100. In some embodiments, the NIC increases the outbound credit count at a predefined rate and decreases the outbound credit count in accordance with the size of an outbound message (or packet) transmitted. The NIC decreases the response credit count in accordance with the amount of data requested by each scheduled message that requests data from a remote node, and increases the response credit count by the amount of data requested, in response to receiving the data response message.

At a scanning step 104, the NIC scans the SQs in which outbound messages are pending for transmission via port 60. In some embodiments, the NIC scans the SQs sequentially in a predefined order, and transmits from the visited SQs numbers of packets corresponding to the QoS levels respectively assigned to the SQs. As such, a SQ having a high priority transmits in a scanning round a number of packets larger than an SQ having a low priority. Such an arbitration scheme shares the available outbound bandwidth of port 60 in accordance with the QoS levels assigned to the SQs.

At a SQ query step 108, the NIC checks the occupancy of the currently visited SQ, and if the SQ is empty the method loops back to step 100. Otherwise, the NIC checks, at a credit checking step 112, whether available outbound credits are sufficient for transmitting the outbound message pending at the top of the currently visited SQ, and if not, the method loops back to step 100. Otherwise, the NIC checks whether the outbound message is requesting data from a remote node, at a message type query step 116.

When at step 116 the message does not request data from any remote node, the NIC schedules that message for transmission based on the available outbound credits, at a first scheduling step 120. For example, the NIC schedules the message for transmission following the currently transmitted message and decreases the outbound credit count accordingly. When at step 116 the NIC detects that the outbound message is requesting data from a remote node, the NIC schedules the transmission of that outbound message based on the available response credits, at a second scheduling step 124.

For example, the NIC handles one or more imminent time-windows during which the requested data may be received. The NIC may schedule the data request for transmission during the nearest time-window for which the requested amount of data meets the available response credits for that time-window.

Following each of step 120 and 124, the NIC proceeds to a transmission step 128, at which the NIC transmits already scheduled messages. Following step 128, the method loops back to step 100 to update the credits.

Although in FIG. 4, steps 100 and 128 are executed as part of the outer loop of the method, this is not mandatory. In alternative embodiments, the NIC may execute at least one of steps 100 and 104 as a separate task, e.g., cyclically.

The embodiments described above refer mainly to scheduling outbound messages for preventing incast congestion. In alternative embodiments, precise scheduling of multiple different resources may be determined, not just the available bandwidth. By reading certain values from the packets, the NIC may maintain credits corresponding to several different resources. When identifying that one of these resources is unavailable, the outbound message (e.g., the QP containing the WQE specifying the outbound message may be moved to a special SQ to wait for that resource to become available.

An example resource comprises the number of concurrent clients. This may be used, for example, to reduce pressure on the incast server and destination addressing information of the remote node to which the data request is destined may be extracted from the packet header. Another example resource comprises the amount of bandwidth of the traffic that will be transferred across any number of different locations in the network in case certain amounts of bandwidths are allocated for different groups of remote nodes. Yet another example resource comprises the number of outstanding requests destined to clients (remote nodes) or corresponding to different transport protocols. This can be used to enforce different performance limitations (e.g., QoS policies) to different clients.

Scheduling outbound messages, including outbound messages that request data from remote nodes, may be used not only for preventing incast congestion, but for controlling other problematic traffic patterns such as traffic bottlenecks across the network. Embodiments described for preventing incast congestions are applicable also in controlling traffic patterns in general, and vice versa.

The embodiments described above are given by way of example, and other suitable embodiments can also be used. For example, although the embodiments above refer mainly to communication network 28 comprising a fabric of interconnected network elements, in other embodiments, other types of networks can be used, such as a wireless network or a combination of wired and wireless network.

The example embodiments described above refer mainly to scheduling outbound messages for preventing incast congestion. The embodiments may be implemented in addition to other suitable congestion control methods.

Although the embodiments described herein mainly address methods for avoiding incast congestion, the methods and systems described herein can also be used in other applications, such as in any application that tracks and limits the usage of some network resource such as (but not limited to) incoming bandwidth.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network adapter, comprising:
   one or more ports, configured to connect to a communication network comprising multiple network elements; and
   circuitry, configured to:
      access outbound messages that are pending to be sent over the communication network to multiple remote nodes via the one or more ports, wherein at least some of the outbound messages specify respective amounts of data that the remote nodes are requested to send back to the network adapter;
      based on the amounts of data specified in the outbound messages, forecast a bandwidth of expected inbound response traffic, by evaluating a volume of the response traffic, which is expected to traverse a selected network element in response to the outbound messages within an imminent time-window, toward the network adapter;
      determine a schedule for transmitting the outbound messages to the remote nodes so that the forecasted bandwidth meets a bandwidth supported by the selected network element; and
      transmit the outbound messages to the remote nodes in accordance with the determined schedule.

2. The network adapter according to claim 1, wherein the circuitry is configured to assign transmission times to the outbound messages so that the forecasted bandwidth meets the bandwidth supported.

3. The network adapter according to claim 2, wherein the circuitry is configured to assign the transmission times based on measured round-trip times in communicating with the remote nodes.

4. The network adapter according to claim 1, wherein the circuitry is configured to break an outbound message that requests a first amount of data into multiple sub-messages requesting respective second amounts of data smaller than the first amount of data, to forecast the bandwidth based on the second amounts of data, and to determine the schedule for transmitting the multiple sub-messages.

5. The network adapter according to claim 1, wherein an outbound message that requests data from a remote node comprises a read command that specifies transferring a given amount of data from a source buffer in a memory of the remote node to a destination address in a local memory accessed by the network adapter.

6. The network adapter according to claim 1, wherein a selected outbound message comprises a read command for direct memory access, in accordance with a Remote Direct Memory Access (RDMA) protocol.

7. The network adapter according to claim 1, wherein the outbound messages are queued in one or more queues having multiple respective Quality of Service (QoS) levels, wherein the circuitry is configured to share available outbound bandwidth among the queues based on the respective QoS levels.

8. The network adapter according to claim 1, wherein the network adapter is coupled to the communication network using multiple ports belonging to a Link Aggregation Group (LAG), wherein the circuitry is configured to forecast bandwidths of portions of the response traffic toward individual ports of the LAG, and to determine the schedule so that the forecasted bandwidths meet bandwidths supported by the individual ports.

9. The network adapter according to claim 1, wherein the circuitry is configured to transmit an outbound message that requests data from a remote node via a first port, and to receive the requested data from that remote node via a second different port.

10. The network adapter according to claim 1, wherein the circuitry is configured to manage a response credit count that is indicative of available bandwidth for the response traffic, and to determine the schedule for transmitting outbound messages that request data from the remote nodes based at least on the response credit count.

11. The network adapter according to claim 10, wherein the circuitry is configured to consume response credits in accordance with amounts of data requested by scheduled outbound messages, to accumulate response credits in accordance with amounts of data received in response to the outbound messages, and to spread the accumulated response credits among multiple queues storing the outbound messages.

12. The network adapter according to claim 1, wherein the circuitry is configured to determine the schedule by limiting a number of transmitted outbound messages for which data requested from the remote nodes was not yet received, to a predefined number.

13. The network adapter according to claim 1, wherein the circuitry is configured to identify an event of a first Queue Pair (QP) related to an outbound message whose processing is delayed by the schedule and is blocking processing of one or more second QPs related to other outbound or inbound messages, the first and second QPs are pending processing in a common Schedule Queue (SQ), and in response to the event, to move the first QP to a different SQ.

14. The network adapter according to claim 1, wherein a remote node supports sending requested data at requested time instances, wherein the circuitry is configured to determine the schedule by sending to the remote node information specifying one or more time instances for sending requested data back in response to the outbound messages.

15. A method for communication, comprising:
   In a network adapter comprising one or more ports for connecting to a communication network comprising multiple network elements,
   accessing outbound messages that are pending to be sent over the communication network to multiple remote nodes via the one or more ports, wherein at least some of the outbound messages specify respective amounts of data that the remote nodes are requested to send to the network adapter;
   based on the amounts of data specified in the outbound messages, forecasting a bandwidth of expected inbound response traffic, by evaluating a volume of the response traffic, which is expected to traverse a selected network element in response to the outbound messages within an imminent time-window, toward the network adapter;
   determining a schedule for transmitting the outbound messages to the remote nodes so that the forecasted bandwidth meets a bandwidth supported by the selected network element; and
   transmitting the outbound messages to the remote nodes in accordance with the determined schedule.

16. The method according to claim 15, wherein determining the schedule comprises assigning transmission times to the outbound messages so that the forecasted bandwidth meets the bandwidth supported.

17. The method according to claim 16, wherein assigning the transmission times comprises assigning the transmission times based on measured round-trip times in communicating with the remote nodes.

18. The method according to claim 15, and comprising breaking an outbound message that requests a first amount of data into multiple sub-messages requesting respective second amounts of data smaller than the first amount of data, wherein forecasting the bandwidth comprises forecasting the bandwidth based on the second amounts of data, and wherein determining the schedule comprises determining the schedule for transmitting the multiple sub-messages.

19. The method according to claim 15, wherein a selected outbound message comprises a read command for direct memory access, in accordance with a Remote Direct Memory Access (RDMA) protocol.

20. The method according to claim 15, wherein the outbound messages are queued in one or more queues having multiple respective Quality of Service (QoS) levels, and comprising sharing available outbound bandwidth among the queues based on the respective QoS levels.

21. The method according to claim 15, wherein the network adapter is coupled to the communication network using multiple ports belonging to a Link Aggregation Group (LAG), wherein forecasting the bandwidth comprises forecasting bandwidths of portions of the response traffic toward individual ports of the LAG, and wherein determining the schedule comprises determining the schedule so that the forecasted bandwidths meet bandwidths supported by the individual ports.

22. The method according to claim 15, and comprising managing a response credit count that is indicative of available bandwidth for the response traffic, wherein determining the schedule comprises determining the schedule for transmitting outbound messages that request data from the remote nodes based at least on the response credit count.

23. The method according to claim 15, wherein a remote node supports sending requested data at requested time instances, and comprising sending to the remote node information specifying one or more time instances for sending requested data back in response to the outbound messages.

\* \* \* \* \*